United States Patent
Choi

(10) Patent No.: US 11,906,969 B2
(45) Date of Patent: Feb. 20, 2024

(54) MOBILITY GUIDANCE SYSTEM

(71) Applicants: Hyundai Motor Company, Seoul (KR); Kia Corporation, Seoul (KR)

(72) Inventor: Byoung Il Choi, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 42 days.

(21) Appl. No.: 17/654,476

(22) Filed: Mar. 11, 2022

(65) Prior Publication Data
US 2023/0009013 A1 Jan. 12, 2023

(30) Foreign Application Priority Data
Jul. 6, 2021 (KR) .................. 10-2021-0088696

(51) Int. Cl.
*G06K 9/00* (2022.01)
*G05D 1/00* (2006.01)
*H04N 7/18* (2006.01)
*H04N 1/32* (2006.01)
*G08G 1/052* (2006.01)
*G06V 20/56* (2022.01)

(52) U.S. Cl.
CPC ......... *G05D 1/0214* (2013.01); *G05D 1/0223* (2013.01); *G05D 1/0246* (2013.01); *G06V 20/588* (2022.01); *G08G 1/052* (2013.01); *H04N 1/32363* (2013.01); *H04N 7/185* (2013.01)

(58) Field of Classification Search
CPC .. G05D 1/0214; G05D 1/0223; G05D 1/0246; G06V 20/588; G06V 10/74; G08G 1/052; G08G 1/0112; G08G 1/0129; G08G 1/0141; G08G 1/04; G08G 1/096716; G08G 1/096725; G08G 1/096855; G08G 1/096775; H04N 1/32363; H04N 7/185; H04N 7/188; H04W 4/02; G06Q 50/30
USPC ........................................................... 348/118
See application file for complete search history.

(56) References Cited

U.S. PATENT DOCUMENTS

| | | | |
|---|---|---|---|
| 6,370,475 B1 * | 4/2002 | Breed ................... | G08G 1/161 340/436 |
| 10,678,339 B2 * | 6/2020 | Yeom .................... | G02B 27/18 |
| 11,530,929 B1 * | 12/2022 | Smith ................... | G01C 21/343 |
| 2007/0185644 A1 * | 8/2007 | Hirose ................ | G01C 21/3626 701/532 |
| 2019/0318492 A1 * | 10/2019 | Kim ....................... | G08G 1/167 |
| 2022/0172625 A1 * | 6/2022 | Chou ................... | G08G 1/0116 |

FOREIGN PATENT DOCUMENTS

KR 102153609 B1 9/2020

* cited by examiner

*Primary Examiner* — Gims S Philippe
(74) *Attorney, Agent, or Firm* — Slater Matsil, LLP

(57) ABSTRACT

An embodiment mobility guidance system includes a sensor provided in a mobility and configured to capture a driving video or an image to transmit the driving video or the image, a memory configured to store a danger zone image, a detector configured to compare the driving video or the image captured by the sensor with the danger zone image stored in the memory to detect an existence of a danger zone on a driving path of the mobility, and a guide configured to set a guide zone in response to the detector detecting the existence of the danger zone and a change in a speed or an acceleration of the mobility, and to provide the guide zone to a second mobility.

20 Claims, 3 Drawing Sheets

FIG. 2

|  | Visual information | Tactile information | | Auditory information | |
| --- | --- | --- | --- | --- | --- |
|  | Color of pup-up message | Warning vibration duration | Warning vibration intensity | Warning Voice duration | Warning Voice intensity |
| 1st step (counting < 3) | Yellow | 3 secs | Small | 3 secs | Weak |
| 2nd step (3 < counting < 6) | Orange | 5 secs | Medium | 5 secs | Medium |
| 3rd step (6 < counting) | red | 10 secs | large | 10 secs | Strong |

FIG. 3

| Driving velocity V (unit: km/h) | Collection of Video, sensor data / communication period |
|---|---|
| Stationary state | 1 sec |
| V ≤ 10 | 0.7 secs |
| 10 < V ≤ 20 | 0.5 secs |
| 20 < V ≤ 30 | 0.3 secs |
| 30 ≤ V | Real time |

MOBILITY GUIDANCE SYSTEM

CROSS-REFERENCE TO RELATED APPLICATIONS

The present application claims the benefit of Korean Patent Application No. 10-2021-0088696, filed on Jul. 6, 2021, which application is hereby incorporated herein by reference.

TECHNICAL FIELD

The present disclosure relates to a mobility guidance system.

BACKGROUND

Recently, a small personal mobility market such as an electric kickboard is expanding, and in particular, the Last/First-mile mobility market using an electric kickboard is actively forming. Accordingly, some companies are carrying out a shared-type electric kickboard business.

However, as the number of users of indiscriminate sharing-type electric kickboards (PM) increases, PM-related accidents are also increasing.

Accordingly, amendments to related laws and regulations have been amended so that anyone over the age of 13 can drive an electric kickboard, and user population is expected to gradually expand in the future.

However, in spite of the expansion of these services and user populations, the reality is that the guidance system that enables stable operation of these services is lacking.

Most electric kickboards drive on sidewalks but also on roads, and because sidewalks and roads are not originally designed or managed for electric kickboards, a very dangerous situation is created, and the safety risks related to driving are increasing rapidly.

The matters described as the background art above are only for the purpose of improving the understanding of the background of the present invention, and should not be taken as acknowledging that they correspond to the prior art already known to those of ordinary skill in the art.

SUMMARY

The present disclosure relates to a mobility guidance system. Embodiments of the present invention provide a mobility guidance system capable of improving overall driving safety of a mobility by analyzing the driving video of the mobility to detect a danger zone, and appropriately guiding the danger zone to another mobility when a certain criterion is satisfied, minimizing user discomfort by reducing false detection or guidance in a mathematical and probabilistic way, and at the same time, providing both efficiency and safety by using the same system to detect whether there is a mobility accident and to cope with accident management.

The mobility guidance system according to embodiments of the present invention includes a sensor unit, e.g., a photographing unit, that is provided in a mobility and photographs a driving video or image to transmit it to an outside, a storage unit that stores a danger zone image, a detection unit that compares the driving video or image captured by the photographing unit with the danger zone image of the storage unit to detect a danger zone existing on a driving path of the mobility, and a guide unit that sets a guide zone through whether or not the detection unit detects the danger zone and a change in a speed or acceleration of the mobility, and guides the guide zone to another mobility.

The photographing unit may be integrally mounted on the mobility or an occupant's portable mobile device mounted on the mobility.

The storage unit may be provided in a server, and the photographing unit of the mobility may collect the driving video or image at a preset time interval and transmit it to the storage unit of the server.

The time interval for collecting the driving video or image in the photographing unit of the mobility may become shorter as the speed or acceleration increases.

The photographing unit of the mobility may select the driving video or image based on the speed or acceleration or steering information of the mobility and transmit it to the detection unit.

The detection unit may calculate coincidence probability between a zone existing in the driving video or image captured by the photographing unit and the danger zone image of the storage unit, and detect the zone existing in the driving video or image as the danger zone when the probability is greater than or equal to a preset probability.

When the danger zone is detected by the detection unit and the speed or acceleration of the mobility is reduced to a predetermined level or less in a vicinity of the danger zone, the guide unit may set the danger zone as the guide zone.

The detection unit and the guide unit may be provided in the server, and the server may transmit and receive information through wireless communication with the mobility or a portable mobile device of the mobility's occupant.

The guide unit may guide the set guide zone to a mobility around the guide zone.

The guide unit may guide the set guide zone to another mobility that is expected to reach the guide zone within a predetermined time.

The guide unit may count an accumulation of the guide zone when the same zone is accumulated as the guide zone, and determine a guide method in consideration of the counting of the guide zone when the guide zone is guided to the mobility.

The system may further include an abnormality determination unit that detects whether or not an accident or abnormality of the mobility occurs through driving information including any one or more of the driving video or image, speed, acceleration, and steering degree of the mobility.

The abnormality determination unit may be provided in a server, and the abnormality determination unit may attempt to communicate with a portable mobile device of the mobility's occupant when the accident or abnormality of the mobility is detected.

The driving information may include leaving information on whether or not an occupant leaves the mobility.

According to the mobility guidance system of embodiments of the present invention, the overall driving safety of a mobility is improved by analyzing the driving video of the mobility to detect a danger zone, and appropriately guiding the danger zone to another mobility when a certain criterion is satisfied, user discomfort is minimized by reducing false detection or guidance in a mathematical and probabilistic way, and at the same time, both efficiency and safety are provided by using the same system to detect whether there is a mobility accident and to cope with accident management.

BRIEF DESCRIPTION OF THE DRAWINGS

FIG. 2 is a table showing various guidance methods of a mobility guidance system according to an embodiment of the present invention.

FIG. 3 is a table showing a data collection and communication period of a mobility guidance system according to an embodiment of the present invention.

Figure 1:
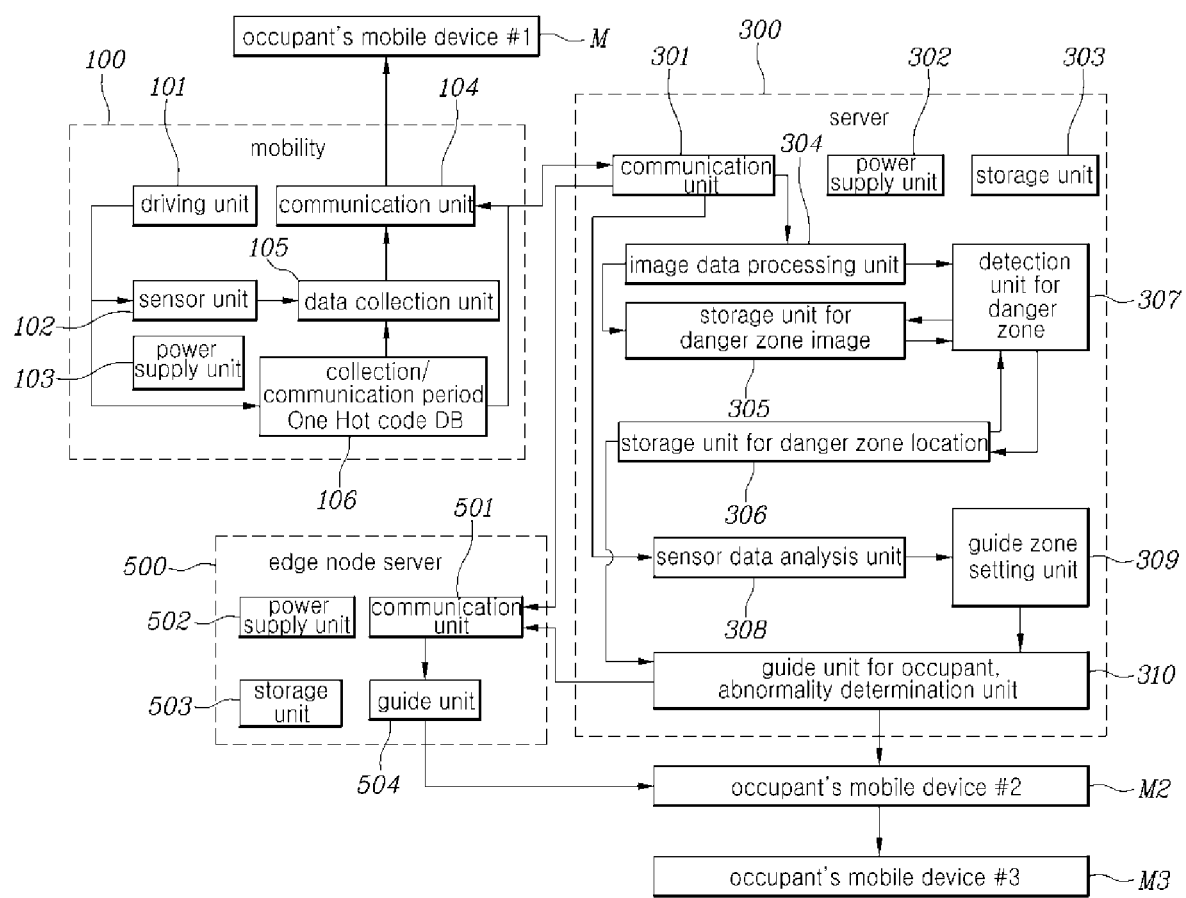
FIG. 1 is a configuration diagram of a mobility guidance system according to an embodiment of the present invention.

The following description of reference numerals may be used in connection with the drawings to further understand the described embodiments.

100: mobility 300: server

M: occupant's mobile device

DETAILED DESCRIPTION OF ILLUSTRATIVE EMBODIMENTS

A detection unit, a guide unit, and the like according to an exemplary embodiment of the present invention may be implemented through a non-volatile memory (not shown) configured to store data about an algorithm of a mobility or server or a software command reproducing the algorithm and a processor (not shown) configured to perform operations described below using the data stored in the corresponding memory. Here, the memory and the processor may be implemented as separate chips. Alternatively, the memory and processor may be implemented as a single chip integrated with each other, and the processor may take the form of one or more processors.

FIG. 1 is a configuration diagram of a mobility guidance system according to an embodiment of the present invention, FIG. 2 is a table showing various guidance methods of the mobility guidance system according to an embodiment of the present invention, and FIG. 3 is a table showing the data collection and communication period of the mobility guidance system according to an embodiment of the present invention.

FIG. 1 is a configuration diagram of a mobility guidance system according to an embodiment of the present invention.

A mobility, which is an application target of embodiments of the present invention, may mean various types of personal small mobility vehicles such as a single-person electric kickboard, an electric bicycle, or a small electric vehicle. Among them, the electric kickboards and the like have very small wheels and since the main driving conditions are roads for general vehicles, the small wheels may get caught in a sinkhole on the road and lead to a serious accident.

In addition, not only in the sinkhole but also in the surrounding environment of the mobility, such as excessive speed prevention, it is not a problem in a general vehicle, but in the case of a small mobility, it can lead to a safety problem. It is apparent that the mobility of embodiments of the present invention may include not only a small electric kickboard, but also a general vehicle. In particular, when applied to an autonomous vehicle and the like, it has the effect of preventing unavoidable accidents in advance, and promptly taking follow-up measures in the event of an accident.

The mobility guidance system according to an embodiment of the present invention includes a sensor unit 102 that is provided in the mobility and captures a driving video or image to transmit it to an outside, a storage unit, i.e., a memory, 305 that stores a danger zone image, a detection unit 307 that compares the driving video or image captured by the sensor unit 102 with the danger zone image of the storage unit 305 to detect a danger zone existing on a driving path of the mobility, and a guide unit and abnormality detection unit 310 that sets a guide zone based on whether or not the detection unit detects the danger zone and changes in the speed or acceleration of the mobility, and guides the guide zone to another mobility.

As shown, the mobility wo of an embodiment of the present invention is provided with a driving unit 101 such as a motor for driving and the sensor unit 102 that collects and photographs various driving information such as speed, acceleration, video and the like. The sensor unit 102 may include a photographing unit of embodiments of the present invention. In addition, the mobility is provided with a communication unit 104 to enable wired/wireless communication with an external environment, and a data collection unit 105 that collects data and stores the video and the driving information. In addition, a power supply unit 103 such as a battery is provided, and the operation of each configuration is performed through the power supply unit 103. In addition, a code database (DB) 106 corresponding to a period for collecting and transmitting information may be provided.

The mobility wo photographs and records a driving video or image through an integrally built-in sensor 102, e.g., a photographing unit or a camera. At the same time, it collects various information such as speed, acceleration, steering, braking and the like while driving and records it simultaneously with the video. In addition, the location information is also recorded at the same time. In addition, it records whether an occupant operates the steering wheel and the like of the mobility, or whether the occupant is in or out of the mobility through a pressure sensor, a touch sensor and the like. Collectively, such information is called driving information.

Alternatively, the built-in camera module in the mobile device M of the occupant boarding the mobility 100 may be sufficiently used as the sensor 102. The storage unit of the mobile device M may be used as the storage unit.

On the other hand, an external server 300 is capable of wired or wireless communication with the mobile device M of the mobility 100 or an occupant through the communication unit 301. The server 300 receives the video, driving information, etc. of the mobility 100 through the communication unit 301 and stores it in the storage unit 303. In addition, the server 300 implements the operation through the power supply unit 302. The server 300 converts the driving video into a state that can be analyzed through an image data processing unit 304. In this process, it is also possible to delete image data of unnecessary parts of the driving video. For example, in the case of the driving video of a road, the video can be pre-processed so that a danger zone existing on the road can be quickly identified by deleting all peripheral parts and cutting only the road to leave the video.

In addition, the server 300 may be provided with the storage unit 305 for a danger zone image that stores a plurality of exemplary danger zone images previously input. Accordingly, the server 300 is provided with the detection unit 307 that compares the driving video or image captured by the sensor 102 received from the mobility with the danger zone image of the storage unit 305 and detects the danger zone existing on the driving path of the mobility.

The detection unit 307 may probabilistically detect whether the danger zone exists in the driving video through image contrast. That is, the detection unit 307 calculates the coincidence probability between the zone existing in the driving video or image captured by the sensor 102 and the danger zone image of the storage unit 305, and may detect the corresponding zone existing in the driving video or image as the danger zone when the probability is greater than or equal to a preset probability.

In addition, the server 300 may include the guide zone setting unit 309 that sets the guide zone based on whether or not the detection unit 307 detects the danger zone and a change in the speed or acceleration of the mobility and guides the guide zone to another mobility.

Specifically, the server 300 may be provided with a sensor data analysis unit 308 to analyze driving information separately from the driving video of the mobility. For example, even if the danger zone is found in the driving video, a corresponding zone may not be the danger zone in the case where the mobility passes the corresponding zone without a change in speed or passes without a change in inertia load. Therefore, in order to prevent such misrecognition, the actual danger zone is identified by combining the image analysis results and actual driving results together.

Therefore, when there is a danger zone in the video, and the speed or acceleration of the mobility decreases before reaching the danger zone, or the speed or acceleration increases again after that, or a change in speed or acceleration or a change in inertial load at the time of passing the corresponding zone occurs, the server 300 recognizes this zone as an existing danger zone, and sets this as a guide zone that should also be notified to another mobility.

Therefore, the server is provided with a sensor data analysis unit 308 that analyzes the driving information of the mobility, and a guide zone setting unit 309 that sets the guide zone to be notified to other mobilities or occupants according to the analysis result. It is apparent that when setting the guide zone, the GPS location of the corresponding point recorded in the storage unit of danger zone location 306 is included. Finally, the guide unit and abnormality detection unit 310 informs other mobilities of the corresponding guide zone through communication.

Meanwhile, the storage unit 303 is provided in the server 300, and the sensor 102 of the mobility 100 may collect driving videos or images at preset time intervals and transmit them to the storage unit 303 of the server. Here, the time interval for collecting the driving video or image by the sensor 102 of the mobility 100 may be shortened as the speed or acceleration increases. When video is transmitted from the mobility 100 to the server 300 in real time, data processing is difficult, data loss may occur, and communication may be overloaded. In order to prevent such a problem, in embodiments of the present invention, the ONE HOT CODE is provided in the mobility 100 or the terminal M of the occupant.

FIG. 3 is a table showing the data collection and communication period of the mobility guidance system according to an embodiment of the present invention. In the stationary state, a video is transmitted at an interval of 1 second to the server, and as the speed increases, the time interval of video collection and transmission can be set to be shorter. Through this, the length of the actual road according to the video to be analyzed in the server can be managed at a similar level, thereby maintaining the efficiency and consistency of data processing to prevent data loss, erroneous detection, or omission, and to reduce the communication load. In addition, when the video is transmitted in such a period, information on the collection period of the transmitted video is also transmitted, so that accurate distance information and location information can be obtained through time information during analysis in the server.

On the other hand, the sensor 102 of the mobility 100 may select a driving video or image based on the speed or acceleration or steering information of the mobility 100 and transmit it to the detection unit 307. In other words, when the amount of data of the video transmitted from the mobility or occupant's terminal is large, selecting only when a change in speed or acceleration or a change in steering is significant, and transmitting and analyzing the corresponding video may be a way to effectively utilize limited resources.

In addition, when the guide zone is identified, the server may propagate the guide zone through an edge node server 500 around it, and for this purpose, the edge node server 500 also may be provided with a power supply unit 502, a communication unit 501, a storage unit, i.e., a memory, 503, and a guide unit 504. Alternatively, the guide zone may be guided to the nearby mobility that the server 300 directly communicates with, or the occupant's mobile device $M_2$, and the corresponding mobile device may transmit the guide zone to another nearby mobility or the occupant's mobile device $M_3$, so that the information sharing and propagation can be done very quickly and efficiently.

That is, the detection unit 307 and the guide unit and abnormality detection unit 310 are provided in the server 300, and the server 300 may transmit and receive information through wireless communication with a mobility or a portable mobile device of a mobility occupant. In addition, the guide unit and abnormality detection unit 310 may guide the set guide zone to a mobility around the guide zone. In particular, the guide unit and abnormality detection unit 310 may guide the set guide zone to another mobility that is expected to reach the guide zone within a predetermined time.

For example, the corresponding guide zone may be guided to all the mobility vehicles or occupants located around the guide zone. But, through the driving direction of the corresponding mobility and the distance from the guide zone or a speed, only the mobility that is expected to pass the corresponding guide zone sooner or later is notified with the guide zone, so that it can prevent sharing of unnecessary information and make it essential to stay safe while focusing more on driving.

In addition, the guide unit and abnormality detection unit 310 counts the accumulation of the guide zone when the same zone is accumulated as a guide zone, and when the guide zone is guided to a mobility, the guide method can be determined in consideration of the counting of the guide zone.

FIG. 2 is a table showing various guidance methods of the mobility guidance system according to an embodiment of the present invention. When the same zone is frequently set repeatedly as a guide zone, the reliability of the guide zone is increased and the guide zone can be seen to increase in importance. Therefore, as the number of counting increases, it is possible to vary the color of a pop-up message or the intensity of sound and vibration guided through a mobility or a mobile device. Through this, it is possible to increase both convenience and safety of occupants by guiding more reliably and effectively in the guide zone with high risk and existence.

In addition, the server 300 may further include the guide unit and abnormality determination unit 310 that detects whether or not there is an accident or abnormality of the mobility through the driving information including any one or more of the driving video or image, speed, acceleration, and steering degree of the mobility.

In the case of an already acquired driving video, it is possible to predict to some extent whether or not an accident occurs through the analysis of the image. That is, if the captured image is suddenly rotated 90 degrees to 180 degrees, it can be viewed as a collapse or overturn due to an accident of the mobility. Therefore, even in this case, it is to detect a mobility accident or abnormality relatively accurately by comprehensively detecting and determining a sudden change in the driving of the mobility along with video analysis.

To this end, the guide unit and abnormality determination unit 310 is provided in the server 300, and when the guide unit and abnormality determination unit 310 detects an accident or abnormality of mobility, it may attempt to communicate with the portable mobile device M of the mobility occupant. That is, when the server 300 detects an accident, it attempts to make a call with the mobility occupant to take first-aid measures, or to immediately contact the police or a related organization so that an emergency response can be provided quickly.

Such driving information may include leaving information regarding whether or not the occupant leaves a mobility. Specifically, the angle change range between a previous video data and a current video data, the change range between a previous speed value and a current speed value, the change range between a previous pressure/piezoelectric sensor value and a current pressure/piezoelectric sensor value, and the change value between a previous steering angle sensor value and a current steering angle are measured, different weights are applied to each change range, and added. Accordingly, it is possible to quickly and accurately detect whether or not an accident occurs.

In addition, by providing this accident detection function together with the guidance of the guide zone described above, it is possible for occupants to use a mobility more safely and conveniently. In addition, these results may be utilized in various ways such as calculating a usage fee for a mobility later, calculating insurance premiums and processing insurance, calculating repair costs, determining whether or not there is negligence, and calculating the depreciation of the mobility, so that convenience and fairness of the overall service use can be realized.

According to the mobility guidance system of embodiments of the present invention, the overall driving safety of the mobility is improved by analyzing the driving video of the mobility to detect the danger zone, and appropriately guiding the danger zone to another mobility when a certain criterion is satisfied, user discomfort is minimized by reducing false detection or guidance in a mathematical and probabilistic way, and at the same time, both efficiency and safety are provided by using the same system to detect whether there is a mobility accident and to cope with accident management.

Although shown and described in relation to specific embodiments of the present invention, it will be apparent to one of ordinary skill in the art that various improvements and changes may be made to the present invention without departing from the spirit of the present invention provided by the following claims.

What is claimed is:

1. A mobility guidance system comprising:
a sensor provided in a mobility and configured to capture a driving video or an image to transmit the driving video or the image;
a memory configured to store a danger zone image;
a detector configured to compare the driving video or the image captured by the sensor with the danger zone image stored in the memory to detect an existence of a danger zone on a driving path of the mobility; and
a guide configured to set a guide zone in response to the detector detecting the existence of the danger zone and a change in a speed or an acceleration of the mobility, and to provide the guide zone to a second mobility, wherein the guide is configured to:
count an accumulation of the guide zone when a same zone is accumulated as the guide zone, and
determine a guide method based on the counting of the guide zone when the guide zone is provided to the mobility.

2. The mobility guidance system according to claim 1, wherein the sensor is integrally mounted on the mobility or is part of an occupant's portable mobile device mounted on the mobility.

3. The mobility guidance system according to claim 1, wherein the memory is provided in a server, and the sensor of the mobility is configured to collect the driving video or the image at a preset time interval and transmit the driving video or the image to the memory of the server.

4. The mobility guidance system according to claim 3, wherein the preset time interval for collecting the driving video or image becomes shorter as the speed or the acceleration increases.

5. The mobility guidance system according to claim 1, wherein the sensor of the mobility is configured to:
select the driving video or the image based on the speed or the acceleration or based on steering information of the mobility; and
transmit the driving video or the image to the detector.

6. The mobility guidance system according to claim 1, wherein the detector is configured to:
calculate a coincidence probability between a zone existing in the driving video or the image captured by the sensor and the danger zone image stored in the memory; and
detect the zone existing in the driving video or the image as the danger zone in response to the coincidence probability being greater than or equal to a preset probability.

7. The mobility guidance system according to claim 1, wherein the detector and the guide are provided in a server, and the server is configured to transmit and receive information through wireless communication with the mobility or a portable mobile device of an occupant of the mobility.

8. A mobility guidance system comprising:
a sensor provided in a mobility and configured to capture a driving video or an image to transmit the driving video or the image;
a memory configured to store a danger zone image;
a detector configured to compare the driving video or the image captured by the sensor with the danger zone image stored in the memory to detect an existence of a danger zone on a driving path of the mobility; and
a guide configured to set a guide zone in response to the detector detecting the existence of the danger zone and a change in a speed or an acceleration of the mobility, and to provide the guide zone to a second mobility, wherein in response to the danger zone being detected by the detector and the speed or the acceleration of the mobility being reduced to a predetermined level or less in a vicinity of the danger zone, the guide is configured to set the danger zone as the guide zone.

9. A mobility guidance system comprising:
a sensor provided in a mobility and configured to capture a driving video or an image to transmit the driving video or the image;
a memory configured to store a danger zone image;
a detector configured to compare the driving video or the image captured by the sensor with the danger zone image stored in the memory to detect an existence of a danger zone on a driving path of the mobility; and a guide configured to:
set a guide zone in response to the detector detecting the existence of the danger zone and a change in a speed or an acceleration of the mobility, and to provide the guide zone to a second mobility,
provide the set guide zone to the second mobility around the guide zone, and
provide the set guide zone to a third mobility that is expected to reach the guide zone within a predetermined time.

10. A mobility guidance system comprising:
a sensor provided in a mobility and configured to capture a driving video or an image to transmit the driving video or the image;
a memory configured to store a danger zone image;
a detector configured to compare the driving video or the image captured by the sensor with the danger zone image stored in the memory to detect existence of a danger zone on a driving path of the mobility;
a guide configured to set a guide zone in response to the detector detecting the existence of the danger zone and a change in a speed or an acceleration of the mobility, and to provide the guide zone to a second mobility; and
an abnormality determiner configured to determine whether or not an accident or abnormality of the mobility occurs through driving information including the driving video or the image, the speed, the acceleration, or a steering degree of the mobility, wherein the guide is configured to:
count an accumulation of the guide zone when a same zone is accumulated as the guide zone, and
determine a guide method based on the counting of the guide zone when the guide zone is provided to the mobility.

11. The mobility guidance system according to claim 10, wherein the abnormality determiner is provided in a server, and the abnormality determiner is configured to attempt to communicate with a portable mobile device of an occupant of the mobility in response to the accident or the abnormality of the mobility being detected.

12. The mobility guidance system according to claim 10, wherein the driving information includes leaving information including whether or not an occupant leaves the mobility.

13. A method of providing a mobility guidance system, the method comprising:
providing a sensor in a mobility to capture a driving video or an image to transmit the driving video or the image;
storing a danger zone image;
comparing the driving video or the image captured by the sensor with the danger zone image to detect existence of a danger zone on a driving path of the mobility;
setting a guide zone by a guide in response to detecting the existence of the danger zone and to sensing a change in a speed or an acceleration of the mobility; and
providing the guide zone to a second mobility, wherein the guide is configured to:
count an accumulation of the guide zone when a same zone is accumulated as the guide zone, and
determine a guide method based on the counting of the guide zone when the guide zone is provided to the mobility.

14. The method according to claim 13, wherein the sensor comprises a camera, and wherein the camera is integrally mounted on the mobility or is part of an occupant's portable mobile device mounted on the mobility.

15. The method according to claim 13, wherein the danger zone image is stored in a memory provided in a server, the method further comprising collecting the driving video or the image at a preset time interval and transmitting the driving video or the image to the memory of the server.

16. The method according to claim 15, wherein the preset time interval for collecting the driving video or the image becomes shorter as the speed or the acceleration increases.

17. The method according to claim 13, further comprising:
selecting the driving video or the image based on the speed or the acceleration or based on steering information of the mobility; and
transmitting the driving video or the image.

18. The method according to claim 13, further comprising:
calculating a coincidence probability between a zone existing in the driving video or the image and the danger zone image; and
detecting the zone existing in the driving video or the image as the danger zone in response to the coincidence probability being greater than or equal to a preset probability.

19. The method according to claim 13, wherein the guide is further configured to provide the set guide zone to the second mobility around the guide zone.

20. The method according to claim 13, wherein the guide is further configured to provide the set guide zone to a third mobility that is expected to reach the guide zone within a predetermined time.

* * * * *